United States Patent
Baillargeon

(10) Patent No.: US 9,900,233 B2
(45) Date of Patent: Feb. 20, 2018

(54) TEST TRAFFIC INTERCEPTOR

(75) Inventor: Steve Baillargeon, Gatineau (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1425 days.

(21) Appl. No.: 13/442,196

(22) Filed: Apr. 9, 2012

(65) Prior Publication Data

US 2013/0088977 A1   Apr. 11, 2013

Related U.S. Application Data

(60) Provisional application No. 61/544,004, filed on Oct. 6, 2011.

(51) Int. Cl.
  *H04L 12/26* (2006.01)
  *H04L 12/46* (2006.01)

(52) U.S. Cl.
  CPC ......... *H04L 43/10* (2013.01); *H04L 12/4633* (2013.01); *H04L 43/0811* (2013.01)

(58) Field of Classification Search
  None
  See application file for complete search history.

(56) References Cited

U.S. PATENT DOCUMENTS

| | | | |
|---|---|---|---|
| 8,064,356 B1* | 11/2011 | Krzanowski et al. | 370/252 |
| 2008/0080507 A1 | 4/2008 | Swallow et al. | |
| 2009/0219812 A1* | 9/2009 | Dolganow et al. | 370/231 |
| 2010/0046419 A1* | 2/2010 | Hirano et al. | 370/315 |
| 2011/0222414 A1 | 9/2011 | Borsos et al. | |
| 2011/0249554 A1* | 10/2011 | Chamas et al. | 370/230 |
| 2011/0283140 A1* | 11/2011 | Stevens | H04L 43/50 714/27 |
| 2011/0305150 A1* | 12/2011 | Haver et al. | 370/252 |

FOREIGN PATENT DOCUMENTS

WO   2010/133922 A1   11/2010

OTHER PUBLICATIONS

International Search Report in corresponding International Application No. PCT/IB2012/000715 dated Aug. 1, 2012.
Written Opinion in corresponding International Application No. PCT/IB2012/000715 dated Aug. 1, 2012.
(Continued)

*Primary Examiner* — Chirag Shah
*Assistant Examiner* — Srinivasa Reddivalam
(74) *Attorney, Agent, or Firm* — Patent Portfolio Builders PLLC

(57) ABSTRACT

Presented are methods and apparatus for processing test traffic encapsulated within bidirectional subscriber connections on intermediate nodes. Test packet requests are generated by a test traffic controller and received at a node by an enhanced decapsulator, a decapsulator or at an ingress port. A tunnel header is extracted from the test packet requests and a determination is made as to whether the test packet request destination is for the receiving node or for another node. If the test packet request is for another node the test packet request is forwarded toward the destination node. If the test packet request is for the receiving node then a test packet reply is generated and the test packet reply is sent toward the test traffic controller.

11 Claims, 6 Drawing Sheets

(56) References Cited

OTHER PUBLICATIONS

3GPP LTE TS 129 281 V10.3.0; Universal Mobile Telecommunications System (UMTS); LTE; General Packet Radio System (GPRS) Tunnelling Protocol User Plan (GTPv1-U) (3GTPP TS 29.281 version 10.3.0 Release 10); RTS/TSGC-0429281va30; Oct. 2011; pp. 1-27; Cedex, France.

G. Dommety; "Key and Sequence No. Extensions to GRE"; Network Working Group, RFC 2890; Cisco Systems; Internet Official Protocol Standards (STD 1); pp. 1-7; Sep. 2000; The Internet Society.

K. Hedayat, et al.; "A Two-Way Active Measurement Protocol (TWAMP)"; Network Working Group, RFC 5357, Nortel Networks, Internet Official Protocol Standards (STD 1); pp. 1-26; Oct. 2008.

\* cited by examiner

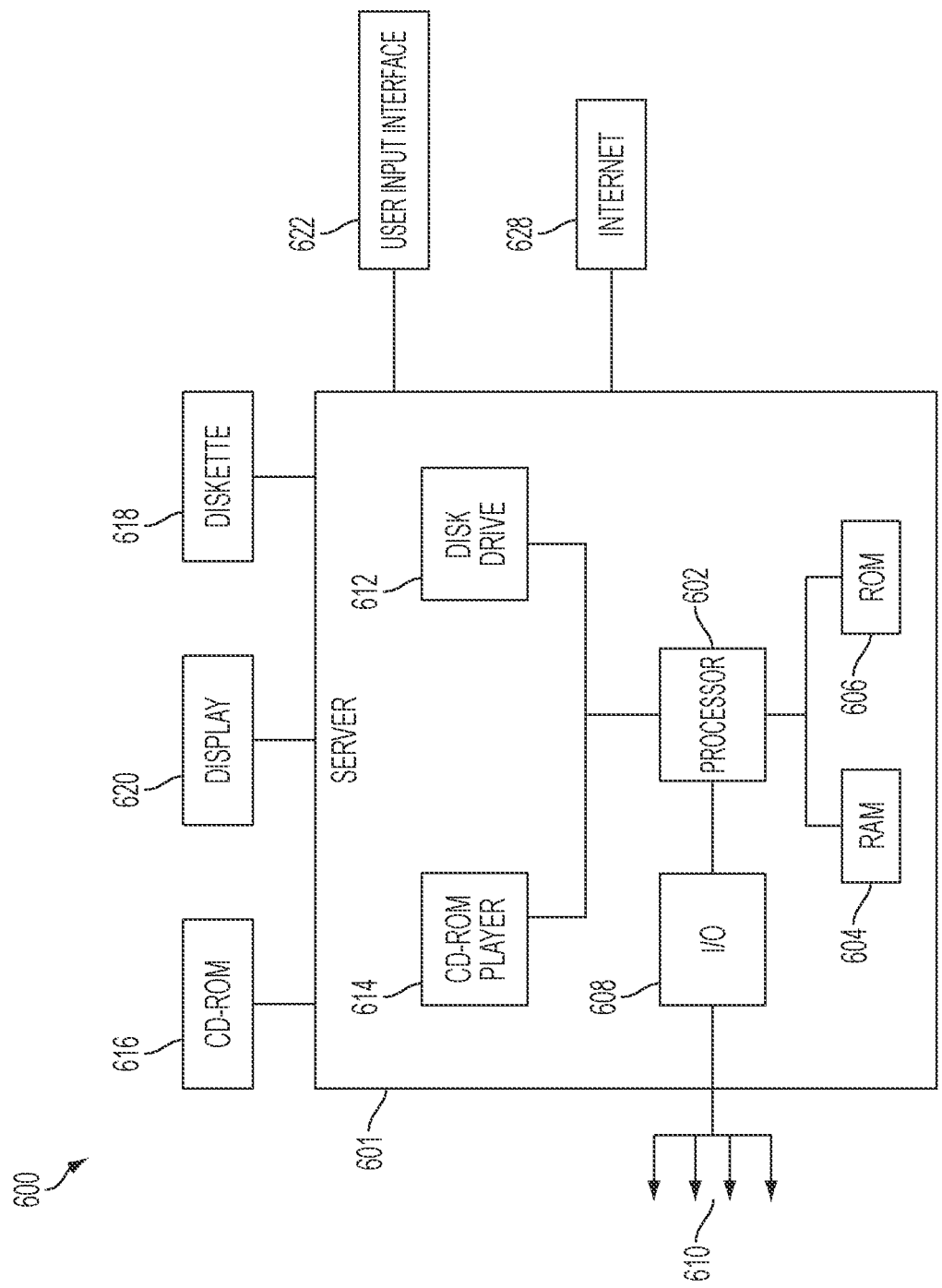

TEST TRAFFIC INTERCEPTOR

RELATED APPLICATION

The present application is related to, and claims priority from, U.S. Provisional Patent Application No. 61/544,004, filed Oct. 6, 2011, entitled "Test Tunnel Interceptor", to Steve Baillargeon, the disclosure of which is incorporated herein by reference.

TECHNICAL FIELD

This disclosure relates to communication subscriber supporting infrastructure in general, and more particularly, and not by way of limitation, to a test traffic interceptor technique suitable for injecting and intercepting test traffic in non-tunneled and tunneled transmission paths in Internet Protocol (IP)-based communications systems, in particular.

BACKGROUND

Knowing the performance of a path, connection or unicast bearer across one or more IP networks is valuable information to network operators and application users. The notion of active probe based sampling of network paths or bearers has been established as a viable methodology for making inferences about the state of a bidirectional subscriber connection, often made of one or more unidirectional tunnels responsible for encapsulating and carrying the forward (downlink) and reverse (uplink) user data traffic to its destination over one or more networks. Connectivity, packet delay, packet loss and User Datagram Protocol (UDP) throughput measurements can be used for troubleshooting, network characterization and application performance estimation on a per-subscriber basis.

User traffic, including any test traffic, transmitted over an IP network and/or encapsulated into a subscriber bearer may not be easily inspected or intercepted by the intermediate nodes. The intermediate nodes are not intended to process or terminate application or test traffic that is destined to the subscriber device. Also, the intermediate nodes may not be aware of the user data traffic and associated applications transmitted over subscriber tunnels. Examples of the tunnels include but are not limited to GTP-U as described in "GPRS Tunneling Protocol User Plane (GTPv1-U), TS 29.281," incorporated herein by reference and GRE as described in "Key and Sequence Number Extensions to GRE, RFC 2890," incorporated herein by reference. The processing of all traffic encapsulated into tunnels can cause significant performance degradation on the intermediate nodes because they are optimized to forward packets from one tunnel to another based on tunnel identifier information provided in the packet header.

The standard Two-Way Active Measurement Protocol (TWAMP) test protocol, described in "A Two-Way Active Measurement Protocol (TWAMP), RFC 5357" which is incorporated herein by reference, is a good non-limiting example of an active probing protocol that can be used to exchange test packets between two hosts or endpoints. For example, a two-way connectivity test can be initiated between a test traffic controller, located in the core network, and a specific subscriber device to determine if the end-to-end bearer or connection to the subscriber has been properly initialized and if the intermediate nodes are properly forwarding the user data traffic on the appropriate tunnels. The same test can also be used for detecting Internet Protocol (IP), Open Systems Interconnection (OSI) layer 2 (L2) or layer 1 (L1) connectivity or performance issues within the underlying packet transport networks.

One of the problems associated with the aforementioned connectivity test is the test traffic transmitted over the subscriber bearer or directly over the IP network, destined to the subscriber address, is only processed by the subscriber connection endpoints. The endpoint is typically a subscriber device. However, most subscriber devices do not, or should not, support the capability to respond to various kinds of test traffic. Considering another possible issue, sending ongoing operator initiated test traffic to a subscriber device can have legal ramifications for the network operators.

Assuming a subscriber device is capable and authorized to reflect test traffic, sending and receiving test traffic over the complete subscriber connection is useful information but often generates all or nothing results, i.e., a two way connectivity test will result in either the subscriber being reachable or the subscriber being unreachable. If the subscriber is unreachable, the test or measurement will not specify the location of the connectivity or performance issue along the end-to-end subscriber connection. A subscriber connection often involves two or more intermediate nodes acting as IP hops or as tunnel traffic forwarders. The intermediate IP hop or the tunnel traffic forwarding nodes can be the cause of the failure, either internal or external failure, or performance issue and may not necessarily have raised an alarm or sent a notification to warn the operator.

Another attempt for determining the performance of a path is illustrated in United States Patent Application Publication 2011222414A1 titled "Method and Apparatus for Active Probing of Tunneled Internet Protocol (IP) Transmission Paths" which teaches in part the use of a user equipment emulator as a substitute for a subscriber device endpoint which may avoid sending operated initiated test traffic to a subscriber device. Unfortunately, the user equipment emulator approach will generate results even when a real subscriber device is unreachable, providing inaccurate data.

Accordingly, it would be desirable to provide devices, systems and methods for path performance determination in such systems that avoid the afore-described problems and drawbacks.

SUMMARY

According to an exemplary embodiment, a node for managing test traffic for a subscriber connection comprises: a processor configured to execute computer instructions and a memory configured to store the computer instructions wherein the computer instructions further comprise: one or more enhanced decapsulator components configured to decapsulate test packet requests received by the node from another node, one or more enhanced encapulator components configured to encapsulate test packet requests for transmission from the node toward another node and a proxy test packet responder configured to generate a test packet reply for each test packet request which is addressed to the subscriber connection and identified for interception by the node.

According to another exemplary embodiment, a method, stored in a memory and executed on a processor, for managing test packets on a node associated with a subscriber connection comprises: receiving, by the node, test packet requests associated with said subscriber connection, processing, by the node, the test packet requests to determine a destination node address for the test packet requests, forwarding, by the node, each of the test packet requests not addressed to the node toward the test packet request destination node address and forwarding, by the node, a test packet reply, generated by the node, for each of the test packet requests addressed to the subscriber connection and identified for interception by the node toward the test packet request source node.

According to another exemplary embodiment, a node for managing test traffic for a subscriber connection comprises: a processor configured to execute computer instructions and a memory configured to store said computer instructions wherein said computer instructions further comprise: a proxy test packet responder configured to generate a test packet reply for each test packet request addressed to the subscriber connection and identified for interception by said node and a packet filter component configured to direct test packets toward said proxy test packet responder.

ABBREVIATIONS

3GPP $3^{rd}$ Generation Partnership Project
DSCP Differentiated Services Code Point
eNB Enhanced NodeB
EPS Evolved Packet System
EPC Evolved Packet Core
GPRS General Packet Radio Service
GTP GPRS Tunneling Protocol
GTP-U GTP User
GRE Generic Routing Encapsulation
IP Internet Protocol
L1 Layer 1
L2 Layer 2
LTE Long Term Evolution
PDN Packet Data Network
PGW Packet Gateway
RTT Round-Trip Time
SAM Subscriber Active Monitoring
SGW Serving Gateway
TWAMP Two-Way Active Measurement Protocol
UDP User Datagram Protocol
UE User Equipment

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a schematic diagram of a node.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of path performance determination and associated nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
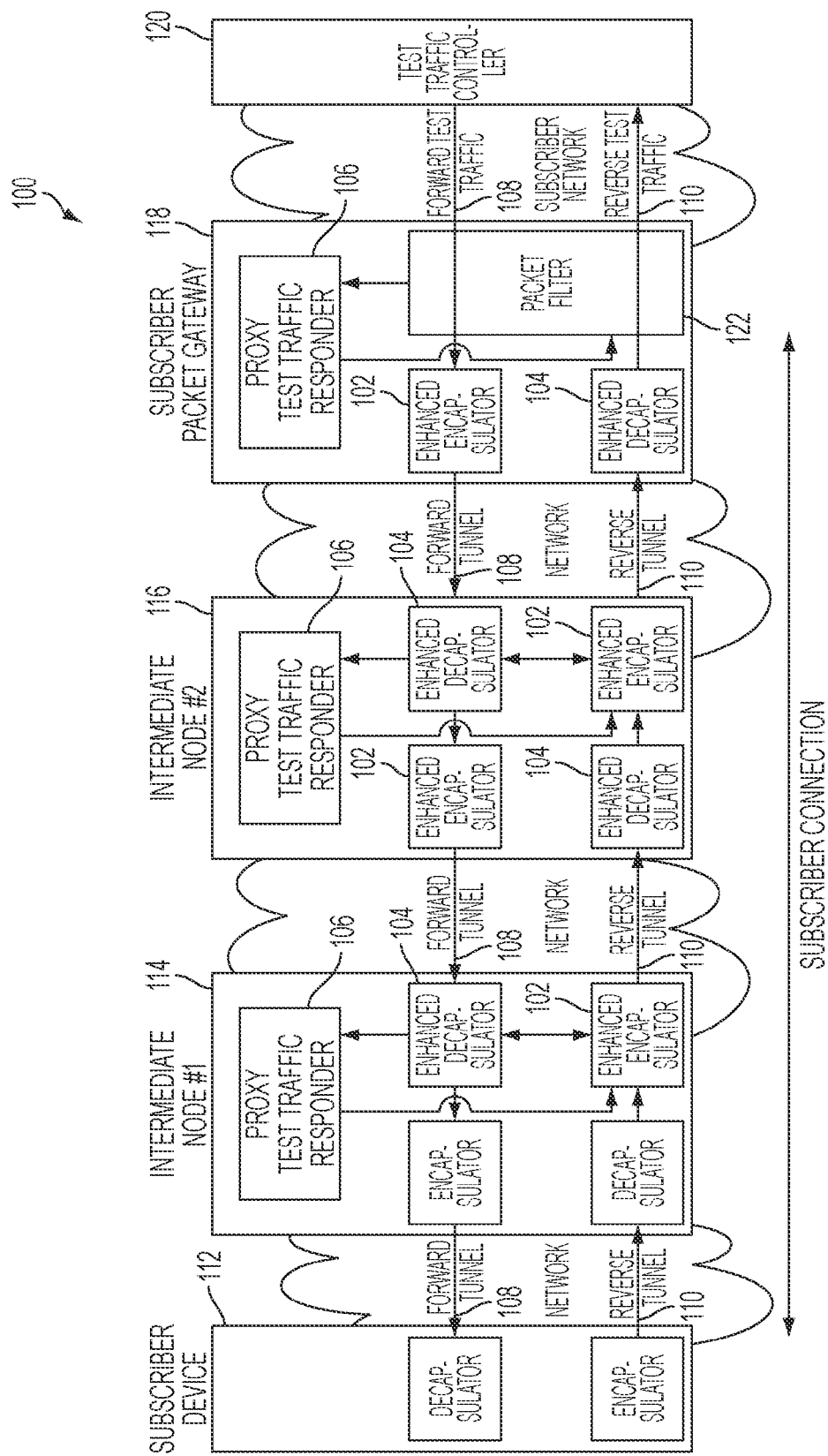
FIG. 1 is a schematic diagram of a communication system including subscriber devices, intermediate network nodes, subscriber packet gateways and test traffic controllers wherein the packet filter is configured only on the packet gateways.

Looking first to FIG. 1, an exemplary embodiment of a subscriber connection comprising a test tunnel interceptor 100 is depicted. The test tunnel interceptor 100 includes but is not limited to an enhanced encapsulator 102, an enhanced decapsulator 104 and a proxy test traffic responder 106.

Continuing with the exemplary embodiment, the enhanced encapsulator 102 is responsible for encapsulating the outgoing subscriber packet that has been identified as a test packet directed towards one of the intermediate nodes 114, 116 along the forward (downlink) path 108. It should be noted in the exemplary embodiment that an intermediate node 116 can comprise an enhanced encapsulator 102 in both the forward (downlink) path 108 and the reverse (uplink) path 110. In another aspect of the exemplary embodiment, the enhanced encapsulator 102 can add one or more extensions or fields to the tunnel header of an outgoing test packet sent toward one of the intermediate nodes 114, 116.

Next in the exemplary embodiment, at the entry point of the subscriber connection, i.e., at the subscriber packet gateway 118, packet filters 122 are configured to trigger an action to add one or more extensions or fields to the tunnel header for filtered packets. It should be noted in the exemplary embodiment that the packet filters 122 can also measure the volume of test traffic transmitted toward each subscriber and assure that the test traffic is included in the subscriber accounting record.

Continuing with the exemplary embodiment, the test traffic originating from the test traffic controller 120 is easily identifiable using basic multi-field classifiers (filters) capable of inspecting addresses, port numbers, protocols, Differentiated Services Code Point, time-to-live (TTL) or any other packet fields associated with the incoming subscriber traffic. It should be noted in the exemplary embodiment that the test traffic controller 120 can also be integrated into the packet gateway 118. It should further be noted that test traffic can be but is not limited to Two-Way Active Measurement Protocol packets which are simply a stream of User Datagram Protocol packets traveling from and toward one or more negotiated or configured ports.

Next in the exemplary embodiment, the packet filter 122 rules are configured such that a unique combination of the packet fields, associated with the test traffic, are mapped to the desired intermediate node 114, 116, e.g., all test traffic from the test traffic controller Internet Protocol address(es) and specific source User Datagram Protocol port(s) can trigger a specific extension number corresponding to a far end intermediate node, i.e., intermediate node 114, or to a node type like a Home NodeB, an enhanced NodeB or a Radio Network Controller. It should be noted in the exemplary embodiment that if a matching node is not found then the subscriber packet is encapsulated with normal tunnel header and the intermediate nodes 114, 116 do not intercept the packet and simply forward the packet to the next peer or subscriber device. It should be noted in the exemplary embodiment that the unique combination of packet fields can be treated as an identifier of an intermediate node 114, 116 and used to determine which node should intercept and process the test traffic.

Continuing with the exemplary embodiment, an intermediate node 114, 116 encapsulates subscriber packets, including test packets, and forwards the encapsulated packets, including test packets with extended or modified headers, toward the next peer as provided by the enhanced decapsulator 104 on its node. It should be noted in the exemplary embodiment that the intermediate nodes 114, 116 do not require any packet filtering capabilities. It should further be noted in the exemplary embodiment that the enhanced encapsulator 102 adds one or more extensions or fields to the tunnel header in the forward (downlink) direction 108. In another aspect of the exemplary embodiment, the enhanced encapsulator 102 does not add any extensions or fields in the reverse (uplink) direction 110. Next in the exemplary embodiment, the reflected test packet generated by the proxy traffic responder 106 on the intermediate nodes 114, 116 can be encapsulated with a normal tunnel header without any additional extensions or fields because the packet is directed toward the source, i.e., the test traffic controller 120.

Continuing with the exemplary embodiment, the enhanced decapsulator 104 provides at least the ability to read, extract and remove the tunnel header, including the extensions or additional fields associated with a test packet header. In another aspect of the exemplary embodiment, the enhanced decapsulator 104 of an intermediate node 114, 116 forwards the incoming test packet, including the extended or modified header, to the enhanced encapsulator 102 on the its node if the extended header indicates the packet is destined for a different node, i.e., another downstream node, or if the extension is unknown.

Next in the exemplary embodiment, an intermediate node 114, 116 intercepts the encapsulated test packet if the extended header indicates the packet's destination is its node. Continuing with the exemplary embodiment, after a packet is intercepted, the enhanced decapsulator 104 performs a lookup on its local tunnel mapping table to determine the reverse (uplink) 110 tunnel information corresponding to the forward (downlink) 108 tunnel. It should be noted in the exemplary embodiment that the lookup can be performed by the enhanced encapsulator 102 after the test packet has been processed by the proxy test traffic responder 106. It should further be noted in the exemplary embodiment that when available, the reverse (uplink) tunnel 110 information, i.e., the reverse tunnel identifier or key, is added to the test packet and the newly constructed test packet is forwarded to the proxy test traffic responder 106 for further processing.

Continuing with the exemplary embodiment, a proxy test traffic responder 106 acts as an intermediary test traffic responder on behalf of the subscriber device, listens for incoming test packets, creates a session state from the initial test packet of a new test session and transmits a new test packet to the source in response to every received test packet. It should be noted in the exemplary embodiment that a proxy test traffic responder 106 can participate in several active sessions at the same time with the same test packet controller 120 or with different test packet controllers 120. It should further be noted in the exemplary embodiment that packets originating from the proxy test traffic responder 106 are time stamped and can be tagged with reverse (uplink) direction 110 sequence numbers. An example of a proxy test traffic responder 106 is a Two-Way Active Measurement Protocol responder.

Next in the exemplary embodiment, the proxy test traffic responder 106 can include information about its node, e.g., an Internet Protocol address or a host name, that the test traffic controller 120 can use to identify the intermediate node 114, 116 that reflected the test packet. It should be noted in the exemplary embodiment that this technique is useful to discover or confirm the intermediate node 114, 116 being used as a proxy test traffic responder 106 within the subscriber connection.

Continuing with the exemplary embodiment, the reflected traffic is delivered to the enhanced encapsulator 102 for packet transmission in the reverse (uplink) direction 110. It should be noted in the exemplary embodiment that the enhanced encapsulator 102 encapsulates the reflected packets and transmits them over the associated reverse (uplink) tunnel 110 that is used by the subscriber traffic originating from the subscriber device 112. It should further be noted that the enhanced encapsulator 102 can also perform a lookup using its local tunnel mapping table to determine the reverse (uplink) tunnel 110 information corresponding to the forward (downlink) tunnel 108.

Next in the exemplary embodiment, advantages of the exemplary embodiments described herein include but are not limited to processing test traffic encapsulated within bidirectional subscriber connections on intermediate nodes 114, 116 with minimal changes or impacts to the current data plane forwarding functions on the intermediate nodes 114, 116 acting as tunnel traffic forwarders. A further non-limiting advantage is that the technique is transparent to the subscribers and does not require any changes to the subscriber device. In another non-limiting advantage, network operators can use a top-down approach for locating failures or performance bottlenecks including connectivity check, packet delay, loss and throughput by testing the different segments between the core network (or subscriber network) and the different intermediate nodes 114, 116 along the end-to-end subscriber connection. It should be noted that this provides the benefits of a remote loopback test without the requirement of subscriber device modification or active participation.

Figure 2:
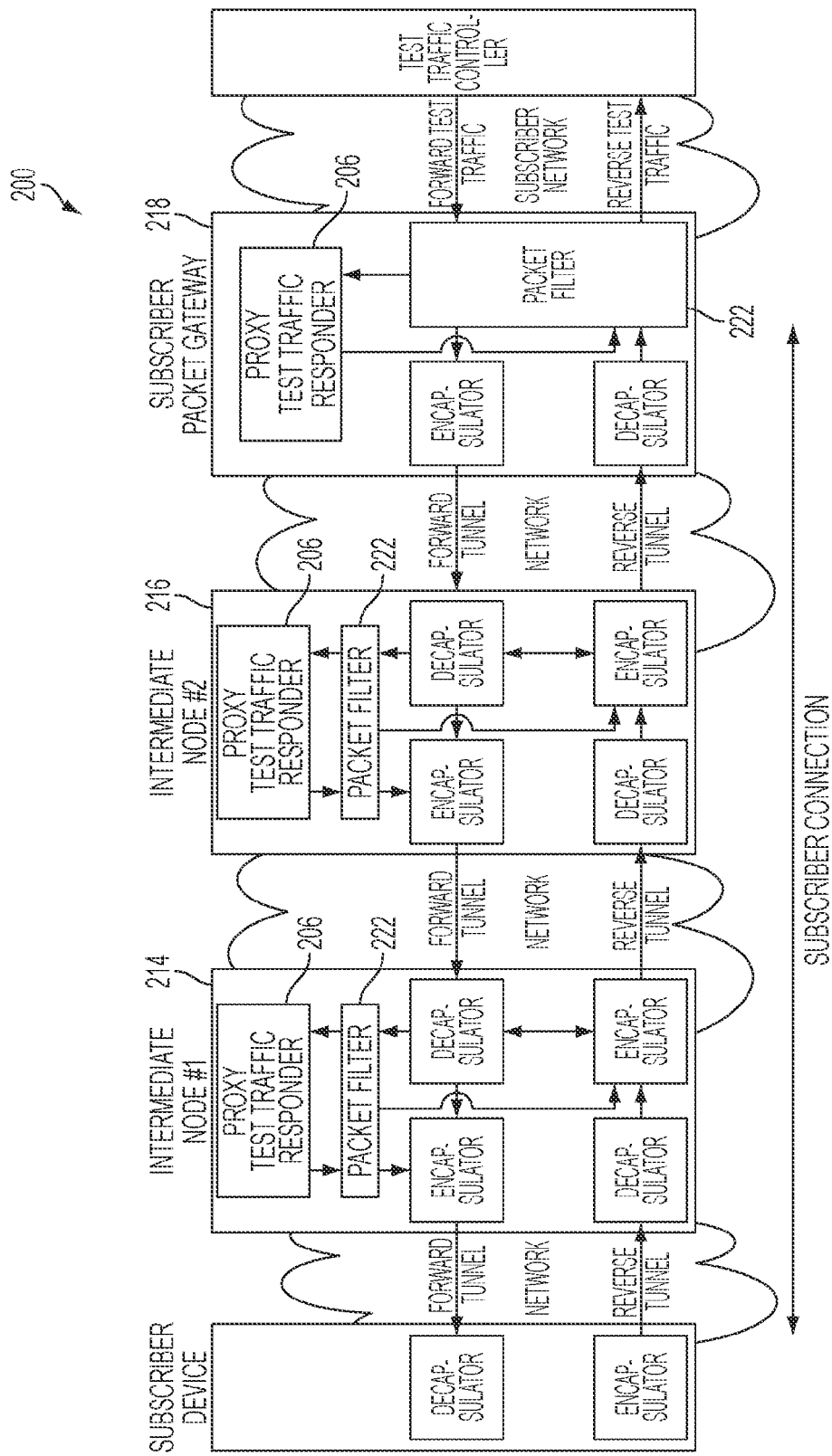
FIG. 2 is a schematic diagram of a communication system including subscriber devices, intermediate network nodes, subscriber packet gateways and test traffic controllers wherein the packet filter is configured on both the packet gateways and the intermediate nodes.

Looking now to FIG. 2, another exemplary embodiment of a subscriber connection communication system 200 is depicted with similar nodes as described for FIG. 1 above with the addition of a packet filter 222 on each intermediate node 214, 216. It should be noted in the exemplary embodiment that the enhanced encapsulators 102 and the enhanced decapsulators 104, shown in FIG. 1, are not required when packet filters 222 are available on each node. Further in the exemplary embodiment, packets arriving at each node are decapsulated, if necessary, and passed to the packet filter 222. Next in the exemplary embodiment, the packet filter 222 directs the packet to a proxy test traffic responder 206 if the packet is a test packet, otherwise the packet is encapsulated and sent toward the next node if it is not addressed to the handling node or returned to its origin if it is addressed to the handling node. It should be noted in the exemplary embodiment that if the packet is a test packet then the proxy test packet responder processes the packet as described for FIG. 1 above.

Figure 3:
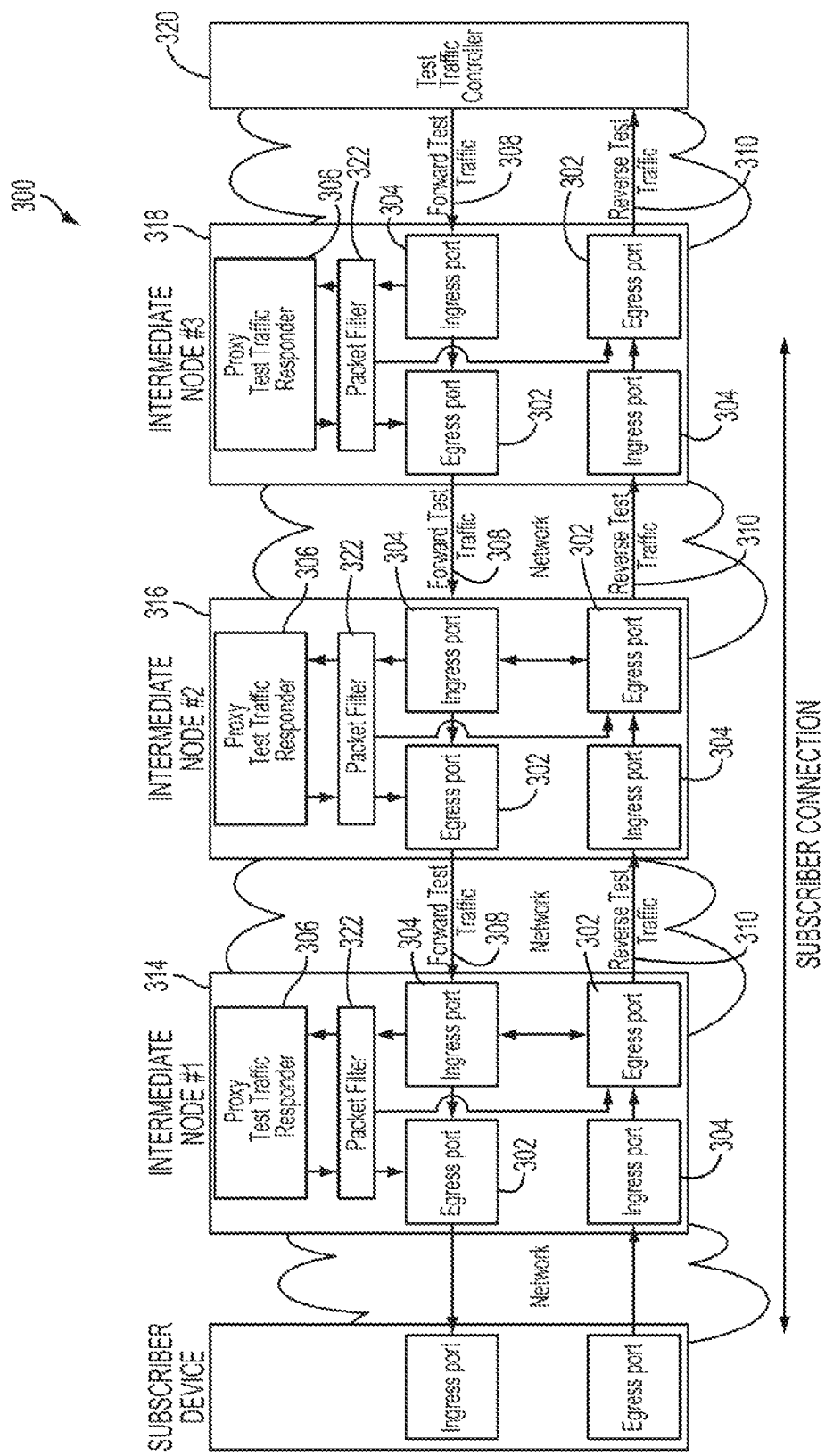
FIG. 3 is a schematic diagram of a communication system including subscriber devices, intermediate network nodes and test traffic controllers wherein a packet filter is configured on each intermediate node.

Looking now to FIG. 3, another exemplary embodiment of a subscriber connection communication system 300 is depicted with intermediate nodes 314, 316, 318 as described for FIG. 2 above but using a non-tunneling protocol, i.e., without encapsulators and decapsulators at each intermediate node 314, 316, 318. Continuing with the exemplary embodiment, each intermediate node 314, 316, 318 provides a proxy traffic responder 306, a packet filter 322, an egress port 302 and ingress port 304 for the forward test traffic direction 308 and an egress port 302 and ingress port 304 for the reverse test traffic direction 310.

Next in the exemplary embodiment, as test traffic from the test traffic controller 320 enters at the ingress port 304 for the forward test traffic direction 308, the test traffic is sent to the packet filter 322, if the test traffic is for the current node then the test traffic is sent to the proxy test traffic responder where a response is generated and sent to the egress port 302 in the reverse test traffic direction 310 for return to the test traffic controller 320. Continuing with the exemplary embodiment, if the test traffic is not for the current intermediate node then the test traffic is sent to egress port 302 for the forward test traffic direction 308 and sent on to the next intermediate node for further comparison and action. As with the previous exemplary embodiments, the subscriber device is not involved in the test traffic processing.

Figure 4:
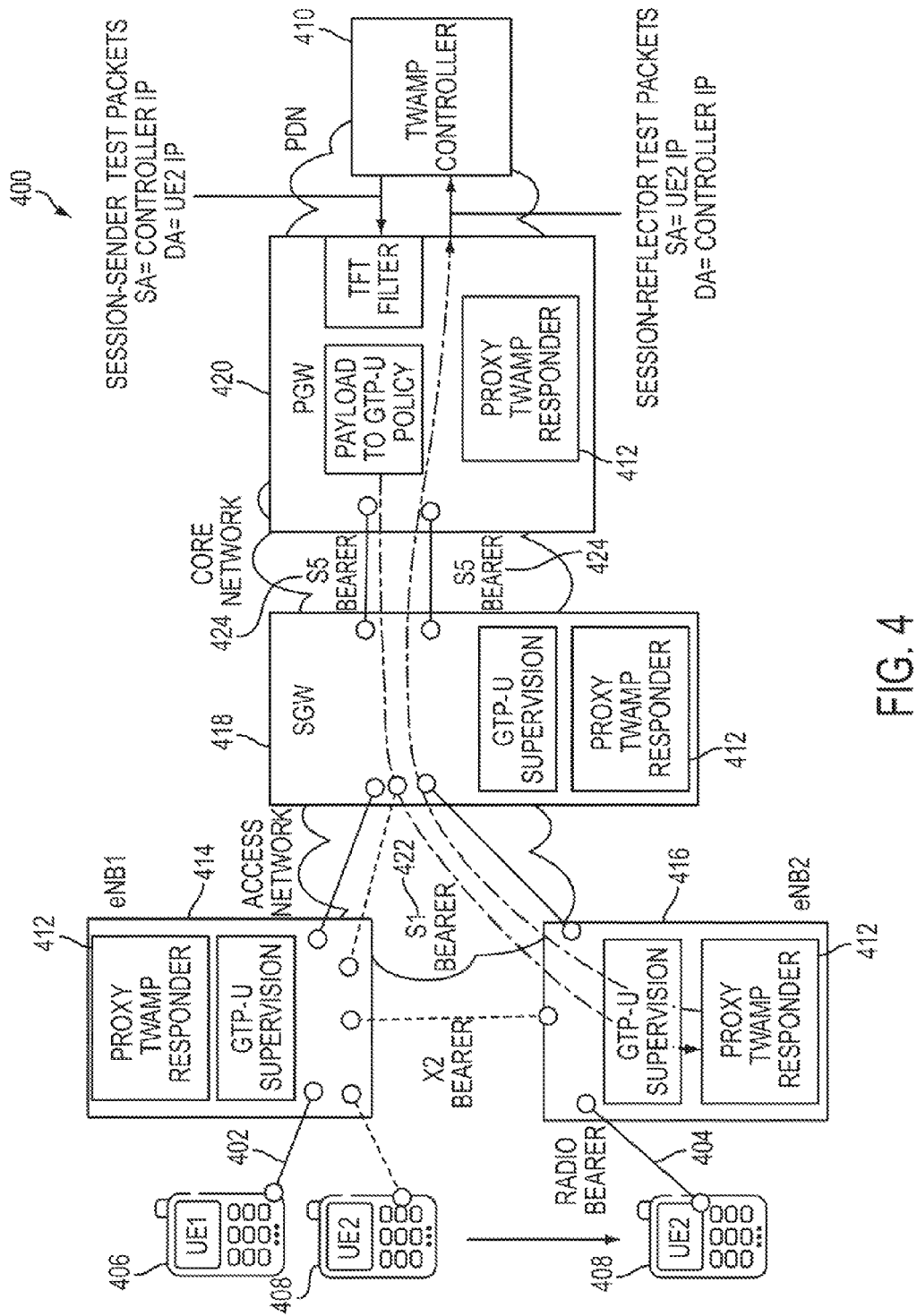
FIG. 4 is a schematic diagram of a communication system including user equipment, eNBs, a serving gateway, a packet gateways and a TWAMP test traffic controller.

Looking now to FIG. 4, an exemplary embodiment of two subscriber connections 402, 404 including nodes associated with aspects of a test traffic interceptor 400 are depicted. It should be noted in the exemplary embodiment that the nodes include but are not limited to a TWAMP Controller 410 and a proxy TWAMP responder 412. It should further be noted in the exemplary embodiment that the nodes include but are not limited to a first eNB 414, a second eNB 416, a Serving Gateway (SGW) 418 and a Packet Gateway (PGW) 420.

Continuing with the exemplary embodiment, the nodes can detect losses in communications at the Long Term Evolution (LTE) bearer level, i.e., user plane, for a specified User Equipment (UE) 406, 408, between the eNB 414, 416 and a Subscriber Active Monitoring (SAM) server in the Packet Data Network (PDN). In another aspect of the exemplary embodiment, the nodes can isolate faults to specific segments of the network from a single endpoint and can measure metrics including but not limited to Round-Trip Time (RTT) for individual bearers. It should be noted in the exemplary embodiment that the metrics can be measured between the eNB 414, 416 and the server in the PDN, and separately across the S1 bearer 422, the S5 bearer 424, the Sgi (not shown) and the Uu (not shown). It should be noted in the exemplary embodiment that test traffic is forwarded on the downlink General packet radio service Tunneling Protocol (GTP) tunnels, test traffic is intercepted on the downlink GTP tunnels, test traffic is reflected on the uplink GTP tunnels, test traffic measurements are collected and interpreted with the knowledge that the User Equipment (UE) 406, 408 can be moving and operational steps or requirements between different nodes/vendors are minimized.

Next in the exemplary embodiment, other aspects include but are not limited to a Subscriber Active Monitoring (SAM) protocol of TWAMP Light+, a SAM server of a Prosilient IP Probes and a SAM client of a Proxy TWAMP Responder 412 on a PGW 420, SGW 418 and an eNB 414, 416. It should be noted in the exemplary embodiment, with respect to the TWAMP Light+ protocol that UDP packets are based on the TWAMP test protocol, measurements are taken for all subscriber path performance metrics with the exception of Transmission Control Protocol (TCP) throughput, IP addresses and/or UDP ports trigger "extended" DL G-PDU handling at the PGW 420, SGW 418 and eNB 414, 416, or trigger packet interception at the PGW 420, SGW 418 and eNB 414, 416, extended TWAMP value-added octets mode allows for GTP-U path discovery, Proxy TWAMP Responder 412 IP address or name is set by the Responder and PGW 420 IP address or name is set by the Responder from the GTP-U extension header.

In another aspect of the exemplary embodiment with respect to SAM servers, dedicated TWAMP Controllers 410 are located in the PDN networks, the SAM servers can originate test traffic addressed to the UEs 406, 408, test traffic follows the same path as the subscriber traffic, test traffic reflected by UEs 406, 408, eNBs 414, 416, SGWs 420 and PGWs 418 can be terminated and path metrics can be collected and correlated. It should be noted in the exemplary embodiment that knowledge of the UE 406, 408 IP address is required and Evolved Packet System (EPS) bearer knowledge is not required but GTP path information should be reported.

Next in the exemplary embodiment with respect to the SAM client, the proxy TWAMP responder 412 is associated with the GTP-U termination point, the proxy TWAMP responder 412 acts as an intermediary TWAMP responder on behalf of the UEs 406, 408, the proxy traffic is the intercepted TWAMP traffic received/transmitted over GTP and the proxy TWAMP responder 412 is reachable only via GTP.

Figure 5:
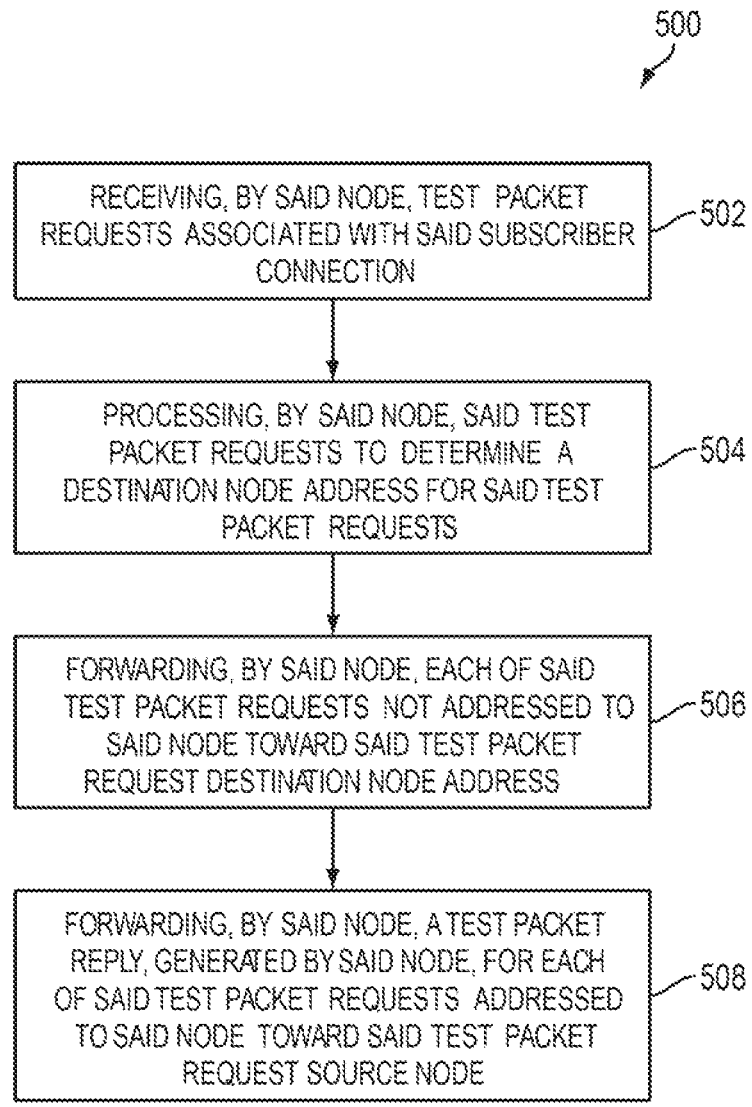
FIG. 5 is flowchart depicting a method for a node to manage test traffic for a subscriber connection in a communication system.

Looking now to FIG. 5, an exemplary method embodiment 500 for managing test packets on a node associated with a subscriber connection is depicted. Beginning at step 502 in the exemplary method embodiment 500, a node receives a test packet request associated with the subscriber connection. It should be noted in the exemplary method embodiment 500 that the test packet request originated from a test traffic controller associated with the subscriber connection. It should further be noted in the exemplary method embodiment 500 that the test traffic controller can be a component of one of the intermediate nodes of the subscriber connection or it can be a component of a subscriber packet gateway associated with the subscriber connection. In another aspect of the exemplary method embodiment, the test packet request can have a destination address of the receiving node or of another node associated with the subscriber connection.

Continuing at step 504 of the exemplary method embodiment 500, the node processes the received test packet request to determine the destination address of the test packet request. It should be noted in the exemplary method embodiment 500 that determining the destination address includes but is not limited to decapsulating a tunnel header from the test packet request and parsing the tunnel header to read the destination address location. It should further be noted in the exemplary method embodiment 500 that a table lookup can be performed to determine reverse tunnel address information based on forward tunnel address information associated with the tunnel header.

Next at step 506 of the exemplary method embodiment 500, the node forwards each of the test packet requests not addressed to the receiving node toward the test packet request destination address extracted from the tunnel header. It should be noted in the exemplary method embodiment 500 that the node can add the reverse tunnel address information to the tunnel header before forwarding the test packet request toward the destination.

Continuing at step 508 of the exemplary method embodiment, the node generates a test packet reply for each of the received test packet requests addressed to the receiving node and forwards each test packet reply toward the test packet request source node. It should be noted in the exemplary embodiment that the node can add identity information associated with the node to the test packet reply before forwarding the test packet reply toward the test packet request source node allowing others to determine the identity of the reflecting node. It should further be noted in the exemplary embodiment that the node can add a timestamp to the test packet reply before forwarding the test packet reply toward the test packet request source node. In another aspect of the exemplary method embodiment, the node can dynamically create a test session state based on receiving an initial test packet request for a test session and that the node can manage a plurality of active test sessions with one or more test traffic controllers.

The subscriber packet gateway or other intermediate network nodes involved in the handling of test packet requests and replies in connection with the above described embodiments may be any type of computing device capable of processing and communicating service capabilities information. An example of a representative computing system capable of carrying out operations in accordance with the servers of the exemplary embodiments is illustrated in FIG. 6. Hardware, firmware, software or a combination thereof may be used to perform the various steps and operations described herein. The computing structure 600 of FIG. 6 is an exemplary computing structure that may be used in connection with such a system.

The exemplary computing arrangement 600 suitable for performing the activities described in the exemplary embodiments may include a subscriber packet gateway or an intermediate node. Such a node 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The node 601 may also include one or more data storage devices, including hard and floppy disk drives 612, CD-ROM drives 614, and other hardware capable of reading and/or storing information such as DVD, etc. In one embodiment, software for carrying out the above discussed steps may be stored and distributed on a CD-ROM 616, diskette 618 or other form of media capable of portably storing information. These storage media may be inserted into, and read by, devices such as the CD-ROM drive 614, the disk drive 612, etc. The node 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The node 601 may be coupled to other computing devices, such as the landline and/or wireless terminals and associated watcher applications, via a network. The server may be part of a larger network configuration as in a global area network (GAN) such as the Internet 628, which allows ultimate connection to the various landline and/or mobile client/watcher devices.

The disclosed exemplary embodiments provide a user terminal, a system, a method and a computer program product for obtaining, storing (caching) and supplying test traffic management associated with users and their device(s). It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

The invention claimed is:

1. A node for managing test traffic for a subscriber connection, said node comprising:
   a processor configured to execute computer instructions and a memory configured to store said computer instructions wherein said computer instructions further comprise:
   one or more enhanced decapsulator components configured to decapuslate test packet requests received, by said node, from another node;
   one or more enhanced encapsulator components configured to encapsulate test packet requests for transmission, from said node, towards another node; and
   a proxy test packet responder configured to generate a test packet reply for each test packet request addressed to the subscriber connection and identified for interception by the node by a unique combination of packet fields in tunnel headers included in test packet requests that are a unique identifier of the node;
   wherein said proxy test packet responder is configured to dynamically creates a session state from an initial test packet request of a new test session;
   wherein said proxy test packet responder is configured to include identity information associated with said node in said test packet reply.

2. A node for managing test traffic for a subscriber connection, said node comprising:
   a processor configured to execute computer instructions and a memory configured to store said computer instructions wherein said computer instructions further comprise:
   one or more enhanced decapsulator components configured to decapuslate test packet requests received, by said node, from another node;
   one or more enhanced encapsulator components configured to encapsulate test packet requests for transmission, from said node, towards another node; and
   a proxy test packet responder configured to generate a test packet reply for each test packet request addressed to the subscriber connection and identified for interception by the node by a unique combination of packet fields in tunnel headers included in test packet requests that are a unique identifier of the node;

wherein said node is a subscriber Packet Gateway (PGW); and further comprising a packet filter located at an entry point of the subscriber PGW and configured to trigger an action to add the unique combination of packet fields mapped to nodes associated with said subscriber connection to the tunnel headers in the test packet requests.

3. A method, stored in a memory and executed on a processor, for managing test packets on a node associated with a subscriber connection, said method comprising:

receiving, by said node, test packet requests associated with said subscriber connection;

processing, by said node, said test packet requests having headers that include unique combinations of packet fields that are unique node identifiers to determine a destination node address for said test packet requests;

forwarding, by said node, each of said test packet requests not addressed to said node toward said test packet request destination node address; and forwarding, by said node, a test packet reply, generated by said node, for each of said test packet requests addressed to the associated subscriber connection and identified by a unique combination of packet fields for interception by said node toward said test packet request source node.

4. The method of claim 3, wherein said receiving further comprises decapsulating a header from said test packet request.

5. The method of claim 4, wherein said header is a tunnel header.

6. The method of claim 3, further comprising a table lookup, by said node, to determine reverse (uplink) tunnel address information based on forward (downlink) information associated with said tunnel header.

7. The method of claim 3, wherein said forwarding said test packet reply further comprises adding identity information associated with said node to said test packet reply.

8. The method of claim 3, wherein said forwarding said test packet reply further comprises adding a timestamp to said test packet reply.

9. The method of claim 3, wherein said processing further comprises dynamically creating a test session state based on receiving an initial test packet request for a test session.

10. The method of claim 3, further comprising managing a plurality of active test sessions with one or more test traffic controllers.

11. A node for managing test traffic for a subscriber connection, said node comprising:

a processor configured to execute computer instructions and a memory configured to store said computer instructions wherein said computer instructions further comprise:

a proxy test packet responder configured to generate a test packet reply for each test packet request addressed to the subscriber connection and containing a unique combination of packet fields in a tunnel header of that test packet request that are a unique identifier of said node that identifies that test packet request for interception by said node; and a packet filter component configured to direct test packets toward said proxy test packet responder;

wherein said proxy test packet responder is configured to include identity information associated with said node in said test packet reply.

* * * * *